United States Patent [19]
Lunsford et al.

[11] 3,862,938
[45] Jan. 28, 1975

[54] 2-(2-AMINOETHYL) PIPERAZINES

[75] Inventors: Carl Dalton Lunsford, Richmond; Albert Duncan Cale, Jr., Mechanicsville, both of Va.

[73] Assignee: A. H. Robins Company, Incorporated, Richmond, Va.

[22] Filed: Feb. 29, 1972

[21] Appl. No.: 230,459

Related U.S. Application Data

[63] Continuation-in-part of Ser. No. 32,346, April 27, 1970.

[52] U.S. Cl...... 260/247.5 D, 260/268 PH, 424/250
[51] Int. Cl........................................... C07d 87/40
[58] Field of Search. 260/268 PH, 247.5 R, 247.5 P

*Primary Examiner*—Donald G. Daus
*Assistant Examiner*—Jose Tovar

[57] ABSTRACT

4-Hydrocarbon-2-(2-aminoethyl)-1-phenylpiperazines active as antiviral agents are disclosed.

5 Claims, No Drawings

2-(2-AMINOETHYL) PIPERAZINES

The present application is a continuation-in-part of co-pending application Ser. No. 32,346 filed Apr. 27, 1970.

The present invention relates to heterocyclic organic compounds which may be referred to broadly as substituted piperazines and is more particularly concerned with 4-hydro-carbon-2-(2-aminoethyl)-1-phenylpiperazines, compositions thereof and methods of making and using the same.

The invention is especially concerned with novel compounds having the formula:

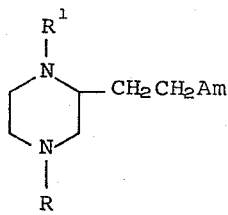

Formula I wherein:
R is selected from the group consisting of hydrogen, lower-alkyl, lower-cycloalkyl and phenyllower-alkyl;
$R^1$ is selected from the group consisting of phenyl, loweralkylphenyl, lower-alkoxyphenyl, halophenyl, and trifluoromethylphenyl,
Am is amino, and
pharmaceutically acceptable acid addition salts thereof.

The novel compounds of the present invention have utility as antiviral agents and are prepared as will be disclosed more fully hereinafter from 1-hydrocarbon-4-phenyl-2,3-dioxo-5-(2-aminoethyl)piperazines disclosed in copending application Ser. No. 32,346 now abandoned and in copending application Ser. No. 230,460 filed on even date herewith.

The novel compounds of the present invention display significant antiviral activity and may be employed in the prophylaxis as well as in the therapy of viral infections of the myxovirus group including, but not limiting thereto, Parainfluenza, Types I and III, Long Strain of Respiratory Syncytial Virus and Type A Influenza infections. The antiviral activity of the novel compounds has been demonstrated by standard in vitro and in vivo techniques including tissue culture and mouse protection tests.

It is, accordingly, an object of the present invention to provide new and useful 4-hydrocarbon-2-(2-aminoethyl)-4-phenylpiperazines. A further object is to provide novel 4-hydrocarbon-2-(2-aminoethyl)-1-phenylpiperazines useful as antiviral agents. A still further object is to provide methods for preparing the new and useful compounds described herein. Other objects of the invention will be apparent to one skilled in the art, and still other objects will become apparent hereinafter.

The term "lower-alkyl" as used herein includes straight and branched chain radicals of up to eight carbon atoms inclusive and is exemplified by such groups as methyl, ethyl, propyl, isopropyl, butyl, secondary butyl, tertiary butyl, amyl, isoamyl, hexyl, heptyl, octyl, and the like. "Lower-alkoxy" has the formula -O-lower-alkyl.

The term "phenyl" as used in the specification and claims hereof refers to the unsubstituted phenyl radical or to a phenyl radical substituted by any radical or radicals which are not reactive or otherwise interfering under the conditions of reactions such as lower-alkoxy, lower-alkyl, trifluoromethyl, halo, and the like. The substituted phenyl radicals have preferably no more than one to three substituents such as those given above and, furthermore, these substituents can be in various available positions of the phenyl nucleus and, when more than one substituent is present, can be the same or different and can be in various position combinations relative to each other. Lower-alkyl and lower-alkoxy substituents each have preferably one to four carbon atoms which can be arranged as straight or branched chains.

The term "cycloalkyl" as used herein includes primarily cyclic alkyl radicals containing three to nine carbon atoms inclusive and encompasses such groups as cyclopropyl, cyclobutyl, cyclohexyl, cyclopentyl, methylcyclohexyl, and cyclooctyl.

When halogen is referred to herein, preferably but not necessarily, a halogen of atomic weight in excess of eighteen but not greater than eighty, is employed.

Among the suitable amino radicals included within the symbol —Am are primary, secondary and tertiary amino radicals, such as unsubstituted amino ($-NH_2$), lower-alkylamino, di-lower-alkylamino, basic saturated monocyclic heterocyclic radicals having up to a maximum of twelve carbon atoms as exemplified by piperidino, pyrrolidino, morpholino, piperazino, lower-alkylpiperazino (e.g., C- or $N^4$-methylpiperazino), and 4-hydroxy-4-phenylpiperidino.

The pharmaceutically acceptable non-toxic salts include the organic and inorganic acid addition salts, for example, those prepared from acids such as hydrochloric, sulfuric, sulfamic, tartaric, fumaric, hydrobromic, hydroiodic, glycolic, citric, maleic, phosphoric, succinic, and the like. Such salts are prepared by conventional methods.

The preparation of the 4-hydrocarbon-2-(2-aminoethyl)-1-phenylpiperazines (I) may be accomplished by mixing and reacting the appropriately substituted 5-(2-aminoethyl)-2,3-dioxo-piperazines (II) with lithium aluminum hydride (LAH). The reaction sequence is illustrated by the following:

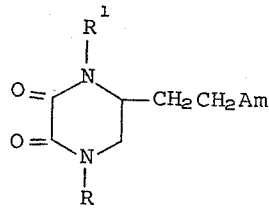

(II)

LAH →

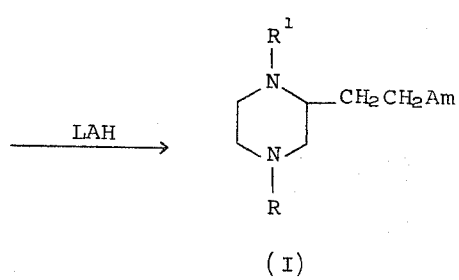

(I)

A suitable procedure for carrying out the process of the invention is as follows:

Conversion of the 1-hydrocarbon-5-(2-aminoethyl)-4-phenyl-2,3-dioxopiperazine (II) to the 4-hydrocarbon-2-(2-aminoethyl)-4-phenylpiperazine (I) may be carried out by reduction of the 2,3-dioxopiperazine (II) with lithium aluminum hydride.

A stirred suspension of lithium aluminum hydride in a suitable solvent, e.g., ether, tetrahydrofuran, and the like, is treated dropwise with a solution of the compound to be reduced. The reduction mixture is refluxed for a period of time, e.g., two to six hours. The reduction complex is decomposed carefully using conventional procedures, and the decomposed reaction mixture is worked up using standard laboratory methods. The product is purified in any appropriate conventional manner.

Compounds of Formula I above wherein R is a benzyl group can be debenzylated by conventional debenzylation techniques, illustratively, by shaking an alcoholic solution of the compound to be debenzylated in an atmosphere of hydrogen using a noble metal catalyst such as palladium. The resultant compound, i.e., a compound of Formula I above, wherein R is hydrogen, is isolated by filtration of the reduction mixture, evaporation of the filtrate and purification of the residue by a suitable laboratory procedure.

The examples immediately following illustrate the preparation of 4-hydrocarbon-2-(2-aminoethyl)-1-arylpiperazines according to the invention.

EXAMPLE 1

4-Methyl-2-(2-morpholinoethyl)-1-phenylpiperazine.

To a stirred suspension of 2.8 g. (0.074 mole) of lithium aluminum hydride in 200 ml. of tetrahydrofuran was added a solution of 10 g. (0.0318 mole) of 2,3-dioxo-1-methyl-5-(2-morpholinoethyl)-4-phenylpiperazine in 100 ml. of tetrahydrofuran. The stirred mixture was refluxed 4 hours, cooled, 10 ml. of water added carefully, filtered and the filtrate concentrated. The oily residue was distilled to give 5.5 g. (60%) of product which was collected at 160°–165°C./0.05 mm.

Analysis: Calculated for $C_{17}H_{27}N_3O$: C,70.55; H,9.41; N,14.52.

Found: C,70.30; H,9.35; N,14.51.

EXAMPLE 2

4-Ethyl-2-(2-morpholinoethyl)-1-phenylpiperazine.

A solution of 10 g. (0.031 mole) of 2,3-dioxo-1-ethyl-5-(2-morpholinoethyl)-4-phenylpiperazine in 100 ml. of tetrahydrofuran was added dropwise to a stirred solution of 2.8 g. (0.074 mole) of lithium aluminum hydride in 200 ml. of tetrahydrofuran. Following the addition, the stirred reduction mixture was refluxed 4 hours. The cooled mixture was decomposed carefully using water, the mixture filtered and the filtrate concentrated under reduced pressure. The residue was distilled at 176°–178°C./0.2 mm. to give 4.7 g. (50%) of product.

Analysis: Calculated for $C_{18}H_{29}N_3O$: C,71.25; H,9.63; N,13.85.

Found: C,70.55; H,9.68; N,13.62.

EXAMPLE 3

4-Cyclohexyl-2-(2-morpholinoethyl)-1-phenylpiperazine.

A stirred solution of 2.8 g. (0.052 mole) of lithium aluminum hydride in 200 ml. of tetrahydrofuran was treated dropwise with a solution of 10.0 g. (0.026 mole) of 1-cyclohexyl-2,3-dioxo-5-(2-morpholinoethyl)-4-phenylpiperazine in 100 ml. of tetrahydrofuran. The stirred reduction mixture was refluxed 4 hours, cooled, decomposed carefully with water, filtered and the filtrate concentrated. The residual oil was distilled at 185°–190°C./0.1 mm. to give 4.5 g. (48%) of product.

Analysis: Calculated for $C_{22}H_{35}N_3O$: C, 73.90; H,9.87; N,11.75.

Found: C,73.66; H,9.93; N,11.61.

EXAMPLE 4

4-Cyclohexyl-2-(2-dimethylaminoethyl)-1-phenylpiperazine.

To a 3 g. (0.08 mole) of lithium aluminum hydride suspended in 100 ml. of tetrahydrofuran was added 13 g. (0.038 mole) of 1-cyclohexyl-2,3-dioxo-5-(2-dimethylaminoethyl)-4-phenylpiperazine in 150 ml. of tetrahydrofuran. The mixture was refluxed 3 hours and 6 ml. of water added carefully. The mixture was filtered and the filtrate concentrated and distilled. The product was collected at 170°–173°C./0.1 mm. and weighed 8.6 g. (72%).

Analysis: Calculated for $C_{20}H_{33}N_3$: C,76.14; H,10.54; N,13.32.

Found: C,75.80; H,10.54; N,13.53.

Using the process described in Example 4, the following compounds are prepared from the stated starting materials:

4-isopropyl-2-(2-pyrrolidinoethyl)-1-(o-methylphenyl) piperazine is prepared by reacting 2,3-dioxo-1-isopropyl-4-(o-methylphenyl)-5-(2-pyrrolidinoethyl)-piperazine and lithium aluminum hydride;

4-isopropyl-2-(2-ethylaminoethyl)-1-(o-methoxyphenyl) piperazine is prepared by reacting 2,3-dioxo-1-isopropyl-4-(o-methoxyphenyl)-5-(2-ethylaminoethyl)piperazine and lithium aluminum hydride;

4-benzyl-2-[2-(4-methylpiperazino)ethyl]-1-(o-chlorophenyl) piperazine is prepared by reacting 1-benzyl-2,3-dioxo-5-[2-(4-methylpiperazino)ethyl]-4-(o-chlorophenyl)piperazine and lithium aluminum hydride; and 4-benzyl-2-[2-(4-hydroxy-4-phenylpiperidino)ethyl]-1-(m-trifluoromethylphenyl)-piperazine is prepared by reacting 1-benzyl-2,3-dioxo-5-[2-(4-hydroxy-4-phenylpiperidino)ethyl]-4-(m-trifluoromethylphenyl)piperazine with lithium aluminum hydride.

EXAMPLE 5

1-Phenyl-2-(2-piperidinoethyl)piperazine

A solution of 35 g. (0.10 mole) of 4-benzyl-2-(2-piperidinoethyl)-1-phenylpiperazine in 200 ml. of ethanol containing 10 gms. of 5% palladium on charcoal catalyst was shaken in three atmospheres of hydrogen until the theoretical amount of hydrogen was absorbed. The hydrogenolysis mixture was filtered, the filtrate concentrated and the residual oil distilled in vacuo to give the 1-phenyl-2-(2-piperidinoethyl)piperazine product.

Formulation and Administration

Effective quantities of any of the foregoing pharmacologically active compounds may be administered to a living animal body in any one of various ways, for example, orally as in capsules or tablets, and parenterally in the form of sterile solutions. The free basic amino compounds, while effective, are preferably formulated and administered in the form of their non-toxic acid addition salts.

The formulations of Example 6 are representative for the pharmacologically active compounds of the invention.

EXAMPLE 6

Formulations (1) Capsules — Capsules of 250 mg. of active ingredient are prepared.

| Typical blend for encapsulation | Mg. per capsule |
|---|---|
| Active ingredient, as salt | 250.0 |
| Lactose | 100.0 |
| Starch | 50.0 |
| Total | 400.0 |

Uniformly blend the selected active ingredient with lactose and starch and encapsulate the blend.

| (2) Injectable | Per cc. |
|---|---|
| Active Ingredient, as salt | 100 mg. |
| Preservative, e.g., chlorobutanol | % w./v. — 0.5 |
| q.s. Water to 1.0 ml. | |

Prepare solution, clarify by filtration, fill into vials, seal and autoclave.

What is claimed is:

1. A compound of the formula

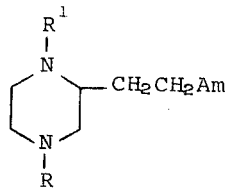

wherein R is lower alkyl or cyclohexyl; $R^1$ is phenyl; Am is lower-alkylamino, di-lower-alkylamino or morpholino or the pharmaceutically acceptable acid addition salts thereof.

2. A compound of claim 1 which is 4-methyl-2-(2-morpholinoethyl)-1-phenylpiperazine.

3. A compound of claim 1 which is 4-ethyl-2-(2-morpholinoethyl)-1-phenylpiperazine.

4. A compound of claim 1 which is 4-methyl-2-(2-dimethylaminoethyl)-1-phenylpiperazine.

5. A compound of claim 1 which is 4-cyclohexyl-2-(2-dimethylaminoethyl)-1-phenylpiperazine.

* * * * *